(12) United States Patent
Ralph

(10) Patent No.: US 6,354,537 B1
(45) Date of Patent: Mar. 12, 2002

(54) AIRCRAFT LANDING GEAR HAVING AXLE TO BRAKE PLATE INTEGRATION

(75) Inventor: Harry C. Ralph, Kirkland, WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/644,931

(22) Filed: Aug. 23, 2000

Related U.S. Application Data

(62) Division of application No. 09/140,487, filed on Aug. 26, 1998, now Pat. No. 6,149,100, which is a continuation-in-part of application No. 08/844,453, filed on Apr. 18, 1997, now abandoned, which is a continuation-in-part of application No. 08/740,618, filed on Oct. 31, 1996, now abandoned, which is a continuation of application No. 08/632,031, filed on Apr. 10, 1996, now abandoned.

(51) Int. Cl.[7] ............................................. B64C 25/02
(52) U.S. Cl. .............................. 244/102 R; 244/103 R; 244/111; 244/50
(58) Field of Search ....................... 244/100 R, 102 R, 244/103 R, 50, 103 W, 111; 180/140–143, 134, 144, 264, 152, 158, 163, 81.1, 81.5, 81.6; 280/24.1, 24.01, 97, 23, 81.5, 24, 95.1, 99, 100; 188/71.5, 72.5, 72.4, 71.1, 194, 329

(56) References Cited

U.S. PATENT DOCUMENTS

| | | | | |
|---|---|---|---|---|
| 1,652,214 A | * | 12/1927 | Putnam | |
| 2,785,907 A | * | 3/1957 | Hutchens et al. | |
| 2,970,792 A | * | 2/1961 | Holmes | 244/50 |
| 3,756,352 A | * | 9/1973 | Urban | 280/96.3 |
| 4,234,236 A | * | 11/1980 | Inbody | 188/18 A |
| 5,562,186 A | * | 10/1996 | Osenbaugh | |
| 5,595,359 A | * | 1/1997 | Meneghetti | 244/50 |
| 5,944,147 A | * | 8/1999 | Berwanger | |
| 6,116,626 A | * | 9/2000 | Cherry et al. | 280/93.512 |

* cited by examiner

Primary Examiner—Galen L. Barefoot
(74) Attorney, Agent, or Firm—Conrad O. Gardner

(57) ABSTRACT

An aircraft landing gear brake arrangement wherein a landing gear stub axle and brake pressure plate are integrated. Each of the integrated assemblies is attached to a support fitting which pivots on the truck axle thereby causing the torque links to be unaffected by steering operations.

5 Claims, 6 Drawing Sheets

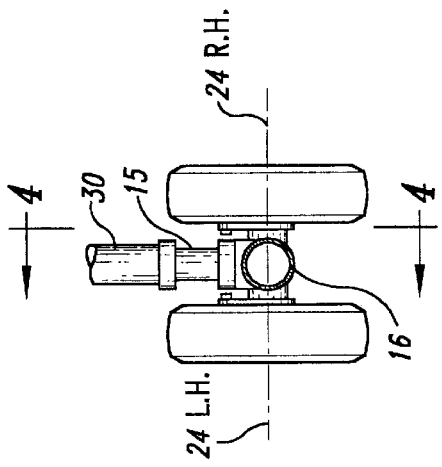
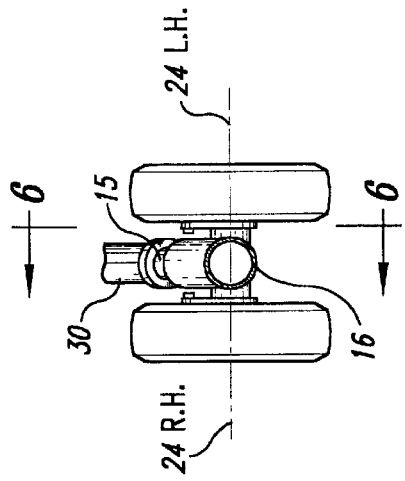
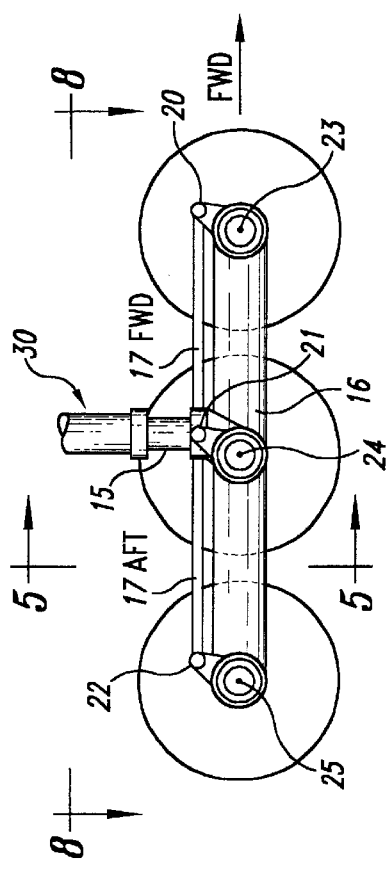
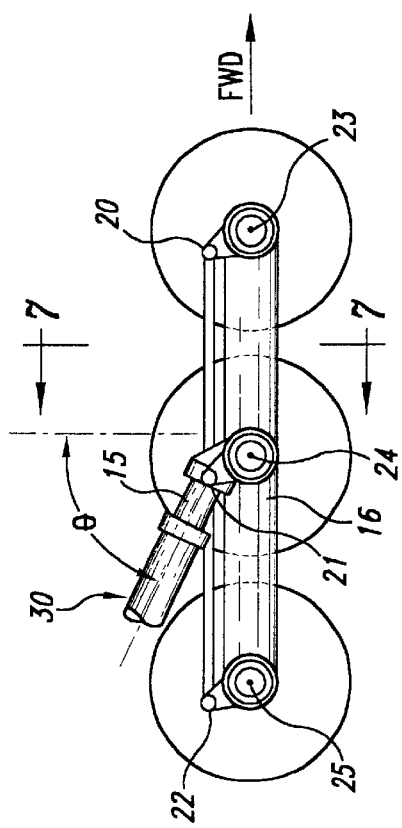

AIRCRAFT LANDING GEAR HAVING AXLE TO BRAKE PLATE INTEGRATION

RELATED APPLICATIONS

This application is a divisional of application Ser. No. 09/140,487, filed Aug. 26, 1998, now U.S. Pat. No. 6,149,100, which is a continuation-in-part of application Ser. No. 08/844,453, filed Apr. 18, 1997, now abandoned, which is a continuation-in-part of application Ser. No. 08/740,618, filed Oct. 31, 1996, now abandoned, which is a File Wrapper Continuation of application Ser. No. 08/632,031, filed Apr. 10, 1996, now abandoned.

TECHNICAL FIELD

The present invention relates to aircraft landing gears for large aircraft, and more particularly to an apparatus and method of attaching wheel and brake assemblies to multi-wheeled aircraft landing gears.

BACKGROUND OF THE INVENTION

Description of the Prior Art Systems

In order to more fully understand the invention hereinafter described it is necessary to understand the present methods of transferring brake torque (from brake to stationary structure) for different types of landing gear e.g., such as in single and twin axle gears for purposes of illustration.

Single and Twin Axle Gears

The simplest method of reacting brake torque from the brake to a stationary part of the gear, is by means of shear bolts in a flanged mounted construction. Typical configurations are shown in FIGS. 1 and 2 for single and twin axles respectively. FIG. 3 shows a typical arrangement of these shear bolts 10 relative to the brake hydraulic actuators, 11 and is common to both FIGS. 1 and 2. A hollow axle 12 is used for both types of gears, and is prevented from rotating relative to the gear inner cylinder 15 by a lock pin 13.

Application of the present invention for these types of gears is impractical as there is no relative rotation between the pressure plate assemblies 28 and the gear inner cylinder 15, during gear retraction, and consequently brake compensating links are not used. In addition, there is probably no requirement for main gear steering for these types of gears.

Gears with Two (or more) Axles

The most common of these gears is the four-wheeled truck type, but the more recent six wheeled truck arrangements (shown in FIGS. 4 and 5) are types of gears more likely to be utilized as aircraft get larger and heavier.

Landing gears with 4-wheel trucks cannot have rigid flange mounted brake connections, due to the rotation of the truck assembly 16 relative to the inner cylinder 15 during landing, taxiing, and during retraction. (Differences between FIGS. 4 and 6 illustrate this rotation.) This also applies to the fore and aft axles of 6-wheeled trucks. In these cases, the brake torque for each individual brake, is transmitted to the non rotating inner cylinder 15 by means of a pin jointed link, generally known as a brake compensating link 17 Fore and 17 Aft.

The brake compensating link pin joints are shown as 20, 21, and 22 in FIGS. 4 and 5, and are of course, left and right handed. In most brake designs the brake "Stator" assemblies 27 and 29 includes the brake pressure plates 28 which contains the brake hydraulic actuators, 11 and is held stationary against rotation (around the axle) by the Compensating Links 17 fore and 17 aft, during the braking operations. The pressure plate assembly, (although located on the axle, is allowed to revolve on that axle as the angle "θ" varies during the gear retraction (see FIG. 6).

Problems with Prior Art Systems When Main Gear Steering is a Requirement

In order to meet the main gear steering requirements, brake compensating links 17 fore and aft, have to align with the steered wheels (see FIG. 8). Such a steering angle (20° minimum) would be in excess of the angular movement of ball joints are used in brake compensating links, and which usually have operating limits of +/−15° Max.

The presence of a conventionally installed brake compensating link 17 restricts the inboard excursion of the tire during main gear steering (see FIG. 8).

Full efficiency of brake compensation is not maintained when braking and steering occur simultaneously. Brake compensating links axle geometry deviates from a true parallelogram as the steering angle increases.

PRIOR ART PATENTS

U.S. Pat. No. 3,403,875 (Hartman) discloses a landing gear in which the brake is mounted on the end of a non-rotating axle stub where the wheel assembly slips over the brake and axle stub, engaging the rotating brake disks by splines on the inside of the hollow axle. The wheel bearing is mounted around the axle stub and the wheel bolts to the outer race of the bearing.

U.S. Pat. No. 4,659,040 (Sinclair) discloses a landing gear truck in which the two rear wheels can swing relative to the front wheels to allow steering at relatively small radii without excessive tire scuff. In this braking system one wheel is fixed to a rotatable common axle while the other wheel is free to rotate about the axle. The braking system is all concentrated in the vicinity of the free wheel where the free wheel is braked and the axle is braked thus braking the other wheel.

SUMMARY OF THE INVENTION

It is an object of the present invention to provide a structure between adjacent wheel brakes which rigidly joins the right-band brake stator 27 to the left-hand brake stator 29 (see FIG. 9). This structure is then capable (when assembled to the gear truck beam 16) of rotating in the plane of axle rotation during retraction, and reacts the brake torque by means of a single compensating link 31, per pair of wheels. A single compensating link 31 permits larger steering angles compared to a conventional double link arrangement, due to the flexibility of its installation position, and its independence of the steerable components. If for installational reasons, a double link is necessary, the present invention would still favor larger steering angles.

In contrast to prior systems having a maximum steering angle of ±8°, the present axle/brake plate integration removes at least this constraint. The present system's ability to move links toward the center of the truck, results in increased clearance between the tire and the compensating rod consequently allowing more steering capacity, about an additional 7°.

More importantly, the single compensating links' geometry, being independent of the wheel steering angle, maintains the characteristics of a parallelogram with the wheel axles, even during steering. Present systems cannot achieve, this completely as the conventional compensating link tries to lengthen or shorten, depending upon which direction the wheel is being steered, due to one end of each link being fixed. (See FIGS. 8 and 8A particularly with regard to components 22/22A, and 20/20A.)

Although the effect is undoubtedly small, the inability of the conventional geometry to maintain a parallelogram with the axles, induces out of balance forces and moments to the truck beam and links during steering. The present invention eliminates this possibility.

The word "parallelogram" is partially defined in FIGS. 4 and 6. The parallelogram is described in those two figures by the points 20, 23 and 21, 24, and 22, 25. The lengths between brake rod points (20 and 21), and (21 and 22), are identical to lengths between axle points (23 and 24) and (24 and 25) respectively, and the distances between (23 and 20) and (24 and 21) and (25 and 22) are all identical also, and is therefore a parallelogram.

This configuration remains a parallelogram no matter what attitude the main cylinder (15 and 30) relative to the centerline connecting the axles (25, 24 and 23) happened to be.

It is desirable that point 24 (the point of rotation between the main cylinder (15 and 30) be on the same waterline as that of the axles 25, 24 and 23. If, for other reasons of design, point 24 is not on the desired waterline, then an out of balance turning moment occurs in the truck when the brakes are applied, and the result is such that there is an ever increasing tendency particularly in the taxiing mode, for the front axle to become overloaded, and the rear axle to lift off the ground. This situation can be overcome by positioning the brake rods such that the instantaneous centers of both the rods and axles intersect each other at the static ground line.

Unfortunately, this process allows a truck to be fully balanced only when the gear system is in the static position which is the most important case. However, for all other gear attitudes (usually during gear retraction or extension), dampers can be used to reduce or eliminate any unbalanced moments on the truck when the brakes are applied. Such dampers are used extensively, but usually for truck positioning purposes only. Their function as a means of reducing, or eliminating this unbalance moment is probably not taken into account.

The reason that the single brake rod would be preferred is that its positioning (nearer to the C/L of the truck) allows the wheel and tire assembly more angular movement, (i.e., ±15 degrees approx. max.) This angle is sometimes less, depending upon the wheel well door opening size or the strength of character of the gear designer.

It must be understood that tire, wheel and brake rotors rotate from the start of an aircraft's takeoff roll, to the time when either internal friction overcomes the momentum of the mass of that assembly when airborne, or the pilot applies the brakes prior to the gear entering the wheel well. This means that for the latter, (and for all instances of brake application) the torque that develops at each brake must be reacted by two equal but opposing forces, acting parallel to each other. Both of these forces leave or enter the first available stationary structure (main inner and outer cylinders), one via the compensating link (single or double), and the other via the truck itself (see FIG. 4A).

BRIEF DESCRIPTION OF THE DRAWINGS

FIG. 4 shows a brake compensating link 17 arrangement for a current 6-wheeled truck in the "gear down" attitude;

FIG. 5 is a section through the middle axle 24, (as shown in FIG. 4) and shows a fixed (or pinned) hollow axle 12;

FIG. 6 shows a brake compensating link (17 fore and aft) arrangement for a current 6-wheeled truck in the "gear retracted" attitude, illustrating the relative rotating angle "θ";

FIG. 7 is a section through the fore and aft axles (23 and 25 respectively as shown in FIG. 6) and shows a typical position of the gear post 32 when retracted. An excessive value of the angle "θ" necessitates the use of two single compensating links due to structural installation difficulties, and the present invention hereinafter described ensures the correct link geometry during steering in both cases;

DETAILED DESCRIPTION OF THE INVENTION

Background Information

The present invention relating to axle to brake plate integration for aircraft landing gear may be utilized in main gear steering systems, e.g., such as shown in U.S. patent application Ser. No. 08/214,483 filed Mar. 17, 1994, titled "MAIN LANDING GEAR HAVING INDEPENDENT STEERING OF EACH AXLE ON MULTIPLE AXLE TRUCKS," details of which are incorporated herein by reference.

Certain distinctive problems arise as aircraft designs proceed into the weight range of 900,000 to 1,500,000 pounds relating to "flotation" a term given to the aircraft/runway relationship and "maneuverability" a term given to the ability to turn an aircraft on the ground. Flotation and maneuverability have adverse effects on one another.

The aircraft/runway relationship is a method by which the strength of a runway is compared with the weight distribution of an aircraft when on the ground. Even with runway improvement (strengthening), it is to be expected that the number of wheels will increase as the aircraft weight increases. This keeps tire sizes to within a practical maximum. Those wheels will be also spread apart as much as possible in order to minimize runway load concentration.

As a result of this, the landing gear designer is called upon to provide the most efficient main gear steering possible. The wheel position, size, and quantity, being predetermined by the aircraft design and runway strength requirements.

It should be appreciated therefore that the present invention is more applicable to four-wheel, and/or six-wheel trucks, as compared to single or twin wheel configurations. As the invention is primarily concerned with very large aircraft, a six-wheel truck is used for exemplary purposes in the detailed description given hereinafter.

It has also a criteria that in order for large aircraft to maneuver successfully on even modern airports, and to keep tire scrub (or wear) to an acceptable minimum, wheel steer angles of up to 20° are anticipated.

The hereinafter described invention enables these large angles to be achieved by a particular system configuration for preventing interferences with either the tire or wheel during the steering operation.

As hereinafter mentioned, the present axle to brake plate integration may be utilized in an individual (king pin) wheel steering system for aircraft landing gear system as shown in my copending U.S. patent application Ser. No. 08/214,483 in contrast to the use thereof in coupled wheel steering systems (aft axle) of the prior art.

Figure 1:
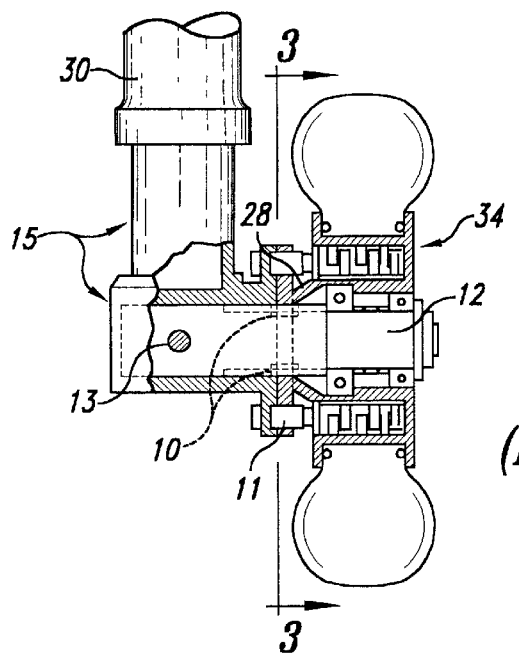
FIGS. 1, 2, and 3 are illustrative of current methods of attachment, and reaction of brake torque, for single and twin wheeled landing gears.
Figure 2:
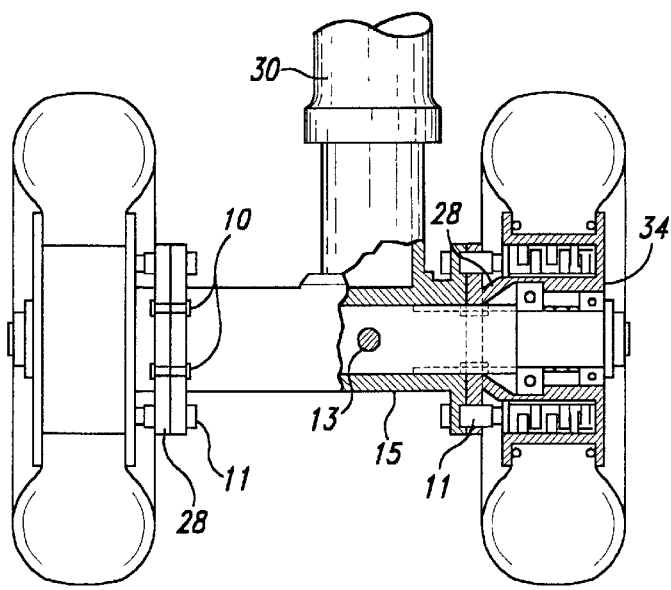
Figure 3:
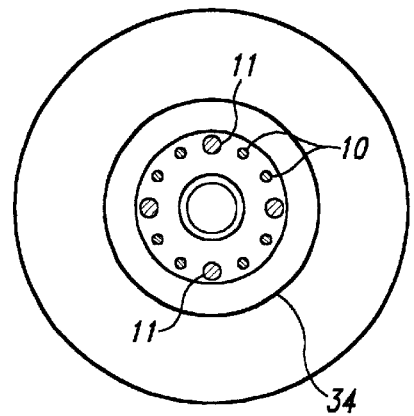
Figure 4A:
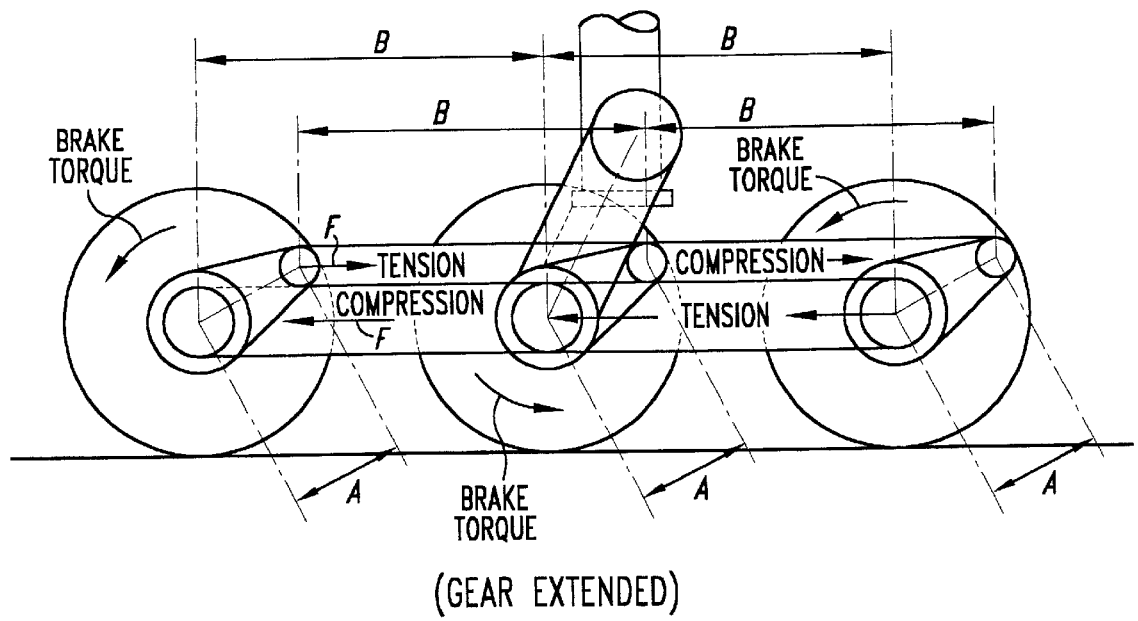
FIG. 4A is illustrative of the 6-wheeled truck of FIG. 4 shown in gear extended position.
Figure 4B:
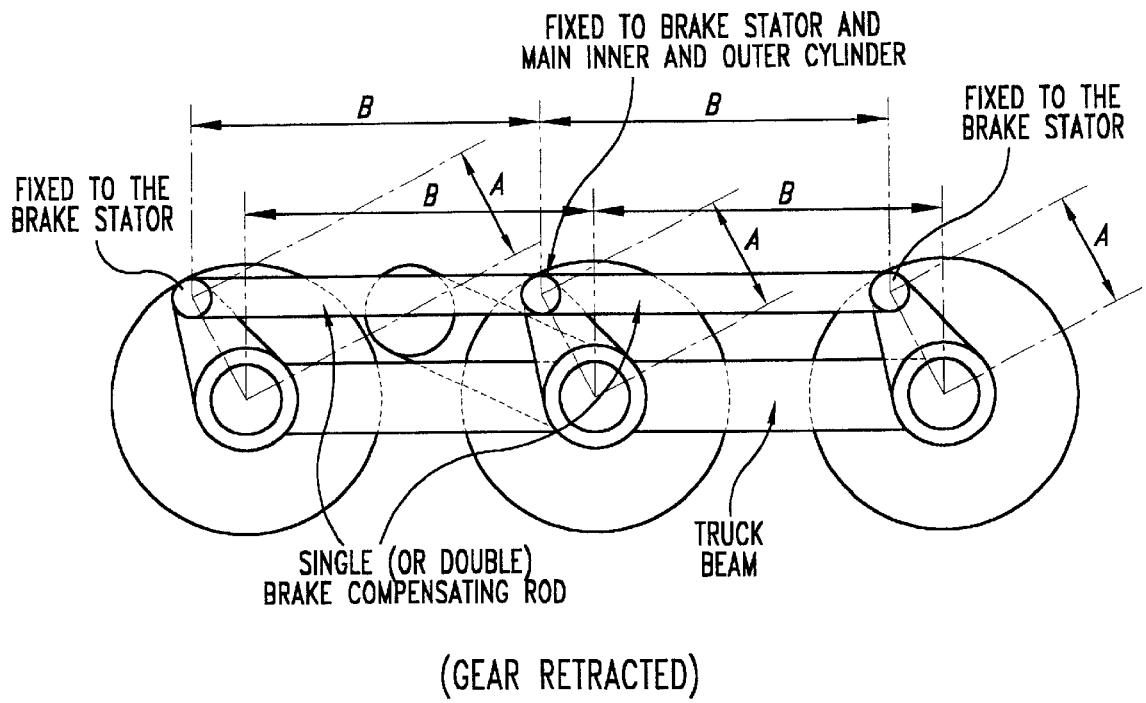
FIG. 4B is illustrative of the 6-wheeled truck of FIG. 4 shown in gear retracted position.
Figure 8:
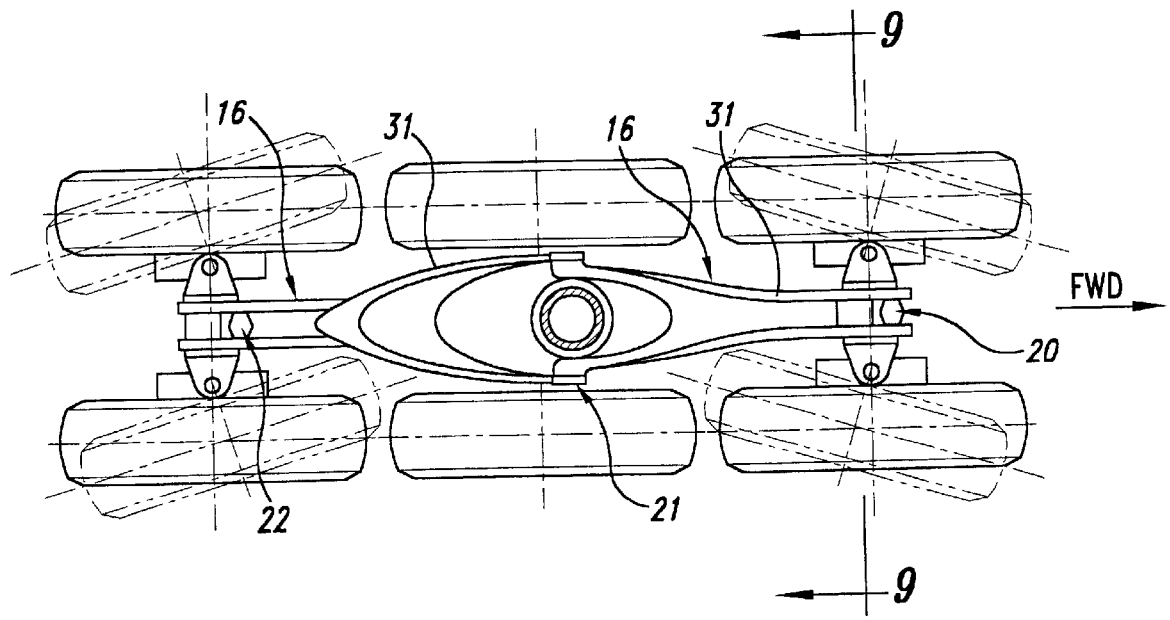
FIG. 8 illustrates how a conventional brake compensating link can seriously limit the movement the steering of a main landing gear wheel, and in addition, large steering angles are limited to say +/−15° because of the ball-jointed end constraints.
Figure 8A:
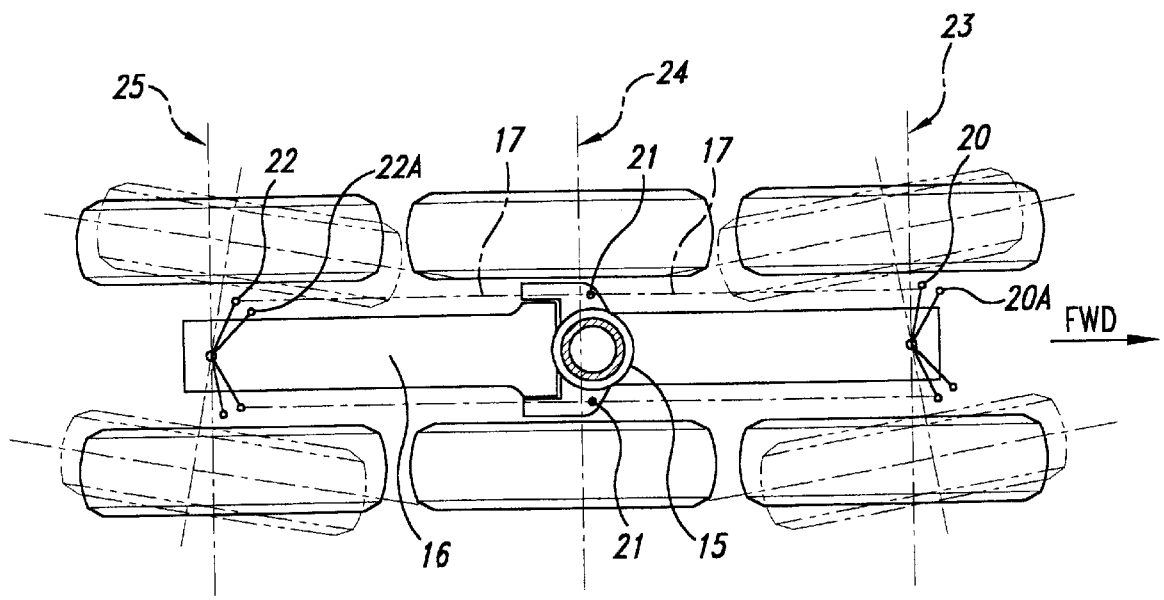
FIG. 8A is illustrative of the advantages of the present single compensating link in accordance the present invention hereinafter described (with regard to wheel clearance while steering) when a king pin or single wheel steering system is used.

The fundamental geometrical differences between these two systems can be demonstrated by comparing FIGS. 8 and 8A.

Figure 9:
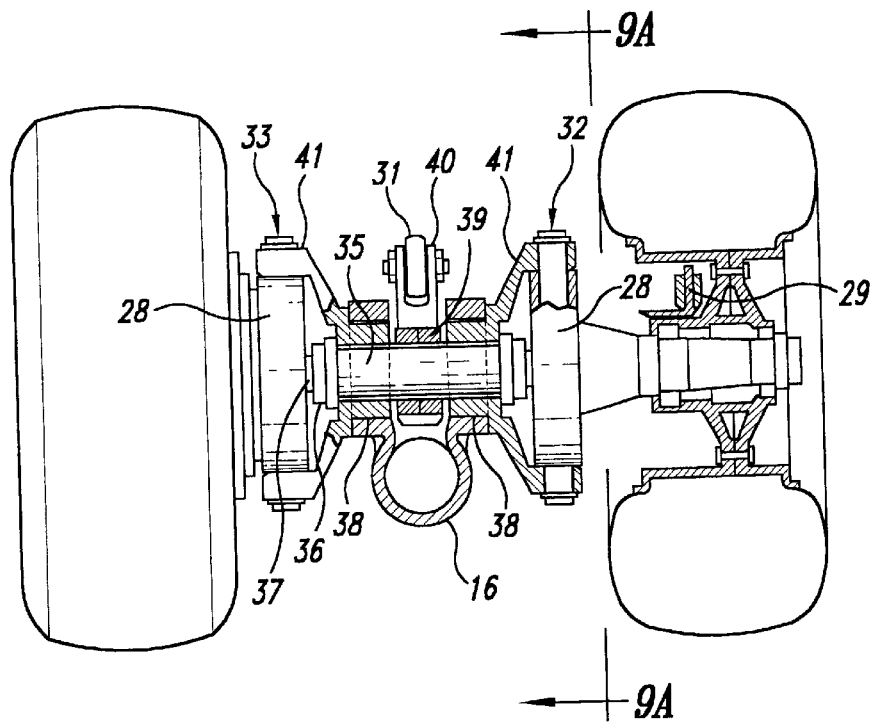
FIG. 9 is an enlarged section through a king pin 32 and 33 steered main landing gear (see FIG. 8A). Also illustrating how a single compensating link 31 in accordance with the present invention can be utilized to the advantage of the overall gear design (larger steering angles)
Figure 9A:
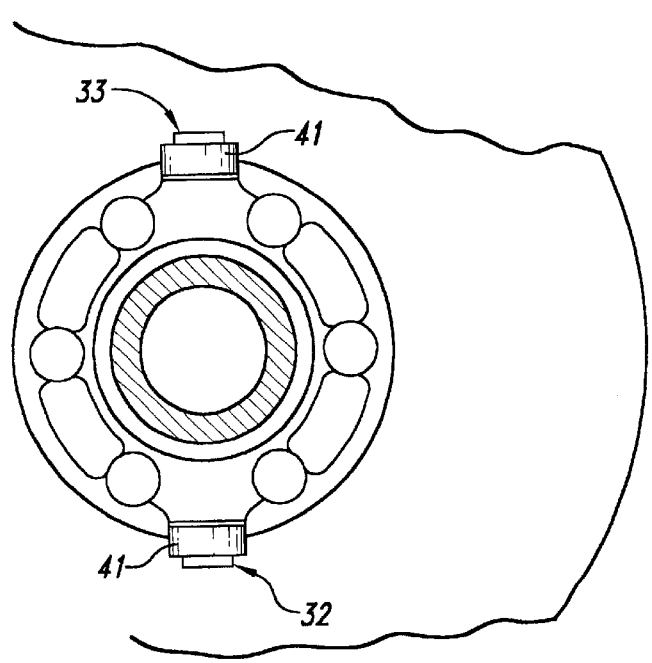
FIG. 9A shows a typical location of a king pin relative to a group of brake hydraulic actuators 11.

In order to effectively join the left and right hand brake pressure plates (or brake stators), substantial though has to be given to the reliability and maintainability of component details. The design shown in FIG. 9 illustrates a typical method of indexing and locking a critical load carrying assembly which concept could be subject to a numerous detail variations.

The two king pin support fittings 41 are assembled end to end (see FIG. 9) and located in cross bearing 38 as part of truck beam assembly 16. These fittings are positioned radially be means of key ways, dogs, pawls, or any other locating device that would accurately position king pin assemblies 32 and 33 parallel to each other.

In addition, the assembled king pin support fittings 41 radically locate the brake compensating link arm 40 in such a way that on final assembly into truck beam assembly 16 and horizontal and both the center lines of the king pin assemblies 32 and 33 and the inner cylinder 15 vertical, the single compensating link can be assembled.

When this stage of assembly is accomplished, king pin support fitting 41 is secured by inserting cross pin 35 which is then, in turn, torqued and locked by locknut and split cotter pin 36 and 37 respectively.

Brake pressure plates 28 are now assembled (secured by king pin assemblies 32 and 33) and hydraulic power connected. It is intended that the wheel, tire, and brake assemblies be assembled either as a unit or in parts (as indicated in FIG. 9B).

APPLICATION OF AXLE TO BRAKE PLATE INTEGRATION WHEN MAIN GEAR STEERING IS NOT REQUIRED

An aircraft with only two main gears, and having a requirement for a six-wheel truck, usually does not require the center axle to steer.

Figure 9B:
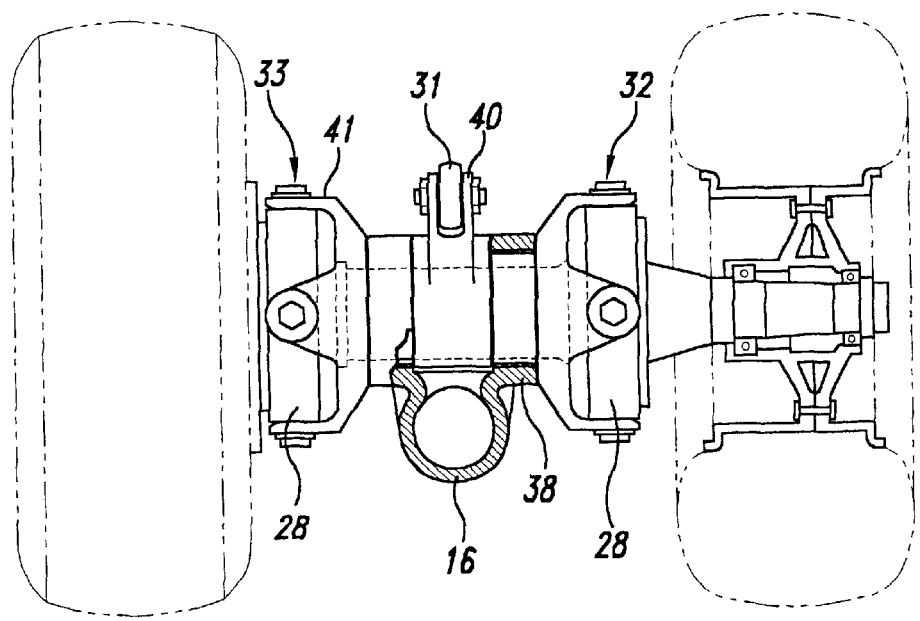
FIG. 9B is a section where through the same plane as in FIG. 9 but through the center axle 24; and, FIG. 9C is a section where through the same plane and location as FIG. 9B, but illustrating the integration of brake pressure plates 28, and king pin support fittings 41 into a common fitting.

Without the need for the king pin in assemblies 32 and 33 some form of bolted construction between brake pressure plates 28 and king pin support fittings 41 will reduce cost and weight (see FIG. 9B).

Figure 9C:
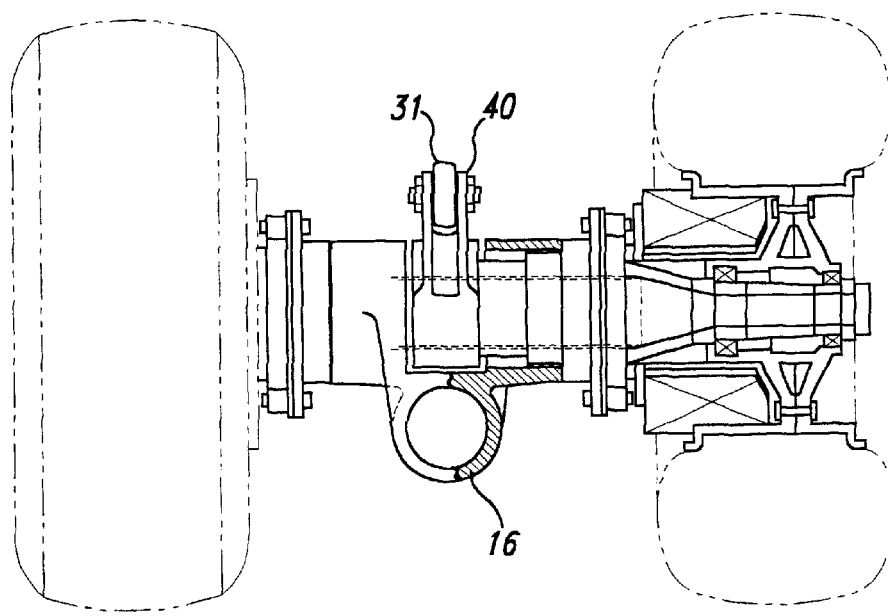

A further reduction of manufacturing cost and component weight would be achieved aforementioned two components integrated into one unit (see FIG. 9C).

In this configuration, thereby having a favorable effect upon brake performance and integrity.

The present invention as herein before described facilitated the optimization of wheel steering angles for main landing gears having more than four wheels, and where there is a requirement for main landing gear steering. Also, the present axle to brake plate integration ensures the continued transfer of brake torque from the brake to the static portion of the landing gear structure for main landing gears having more than four wheels, and having a requirement for main landing gear steering.

Hardware nomenclature utilized in the present axle to brake plate integration for large aircraft landing gear:

10 Shear Bolts
11 Brake Hydraulic Actuators
12 Hollow Axle
13 Lock Pin
15 Inner Cylinder
16 Gear Truck Beam Assembly
17 Brake Compensating Link
18 Center Axle
19 Lower Pivot
20 Brake Compensating Link Pins (Forward)
21 Brake Compensating Link Pins (Center)
22 Brake Compensating Link Pins (Aft)
23 Axle Centers (Forward)
24 Axle Centers (Center)
25 Axle Centers (Aft)
26 Truck Rotation Angle (0°)
27 Brake "Stator" Assembly R.H.
28 Brake Pressure Plate
29 Brake "Stator" Assembly L.H.
30 Landing Gear Post
31 Single Compensating Link
32 King Pin Assembly R.H.
33 King Pin Assembly L.H.
34 Wheel Housing
35 Cross Pin
36 Lock Nut
37 Split Cotter Pin
38 Cross Bearings
39 Indexing Keys
40 Brake Compensating Link Arm
41 King Pin Support Fitting The herein before described axle to brake plate integration provides features and advantages which include the following:

The ability to use a single brake compensating link 31 in order to transfer the torque of two brakes to stable structure.

The obtaining of optimized main gear steering angle, by the ability to position a single brake compensating link 31 further inboard in the truck beam assembly 16.

Enables the wheel steering angle to exceed that of the brake compensating link ball joint capability.

Achieve the joining of the two opposite brake pressure plate assemblies 28 and to provide rotation of these assemblies in the same plane as the axle rotation, together with the indexing these assemblies.

Achieves 100% brake torque compensation for all angles of wheel steering (in conjunction with king pin or single wheel steering).

The independence of the brake compensating link with respect to the brake pressure plate enables the distance between tires to be increased (as required to meet aircraft flotation needs) without giving the brake compensating link a three dimensional geometry. This feature is advantageous in terms of space packaging, weight, and possible limitations of angular movement of ball joints. A two dimensional geometry is achieved by lengthening the pivoting intermediate support fitting.

The use of short stub axles in high temperature environments for multi-wheeled, truck type gears results in increasing rapidly with the bending moment. This provides for a much higher stiffness in brake installation and possible weight reduction.

In the present system, the pivoting intermediate support fittings on the left side of the truck, can be connected to the pivoting intermediate support fittings on the right side of the truck. This enables one set of compensating links per truck assembly to be in lieu of two, and while not so much a weight saving device, is a space consideration.

What is claimed is:

1. A kingpin wheel steering system for an aircraft having retractable landing gears, retractable trucks, and: said kingpin wheel steering system for an aircraft having retractable landing gears, retractable trucks further including axle to brake plate integration.

2. The combination according to claim 1 further including a single brake compensating link to transfer the torque of two brakes simultaneously, via a truck to shock absorber pivot and another point on the shock absorber.

3. The combination according to claim 1, wherein said axle to brake plate integration enables the wheel to be steered to angles in excess of the maximum angular capacity of self-aligning bearings.

4. The combination according to claim 3 wherein said angles are ±15 degrees.

5. The combination according to claim 1, wherein said axle to brake plate integration provides the joining of two brake pressure plate assemblies reacting torque in the same direction and further provides rotation of said brake pressure assemblies in the same plane as the wheel assembly rotation, together with the indexing of said assemblies for the purposes of aircraft takeoff, landing, retraction into aircraft, and aircraft ground maneuvering.

* * * * *